Nov. 11, 1958 — A. M. HOWARD — 2,859,704
VEHICLE HAULAGE SYSTEM
Filed July 17, 1953 — 4 Sheets-Sheet 1

Inventor
ALLAN MAURICE HOWARD,
By
Attorney

Nov. 11, 1958    A. M. HOWARD    2,859,704
VEHICLE HAULAGE SYSTEM
Filed July 17, 1953    4 Sheets-Sheet 2
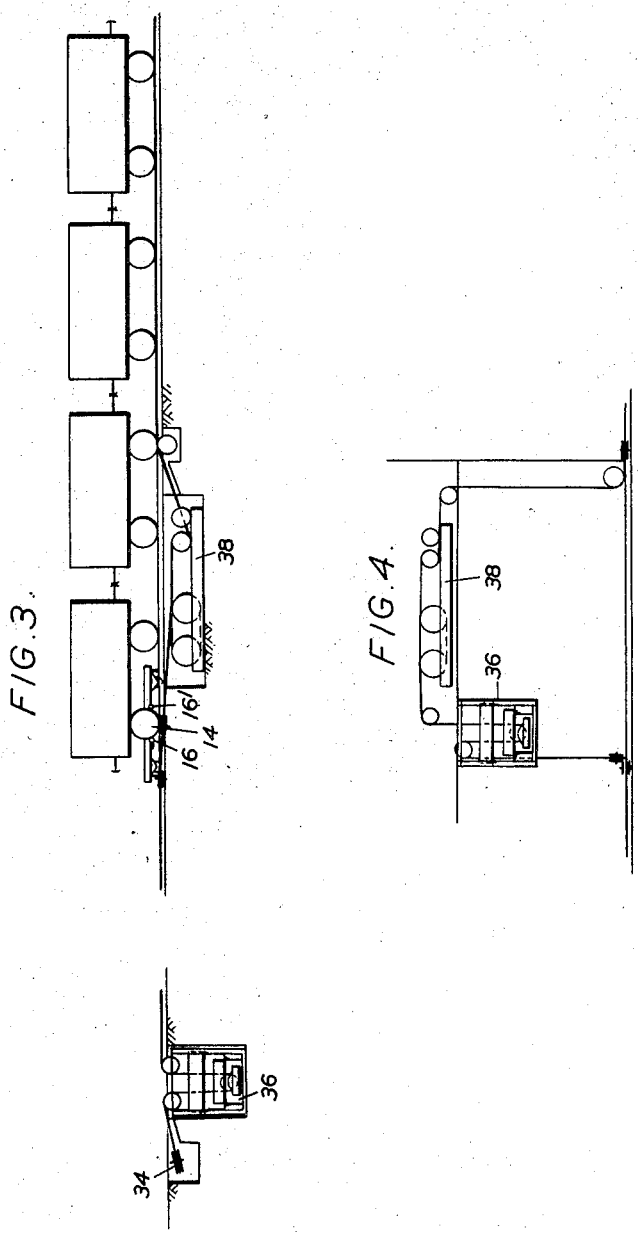
Inventor
ALLAN MAURICE HOWARD,
By
Attorney

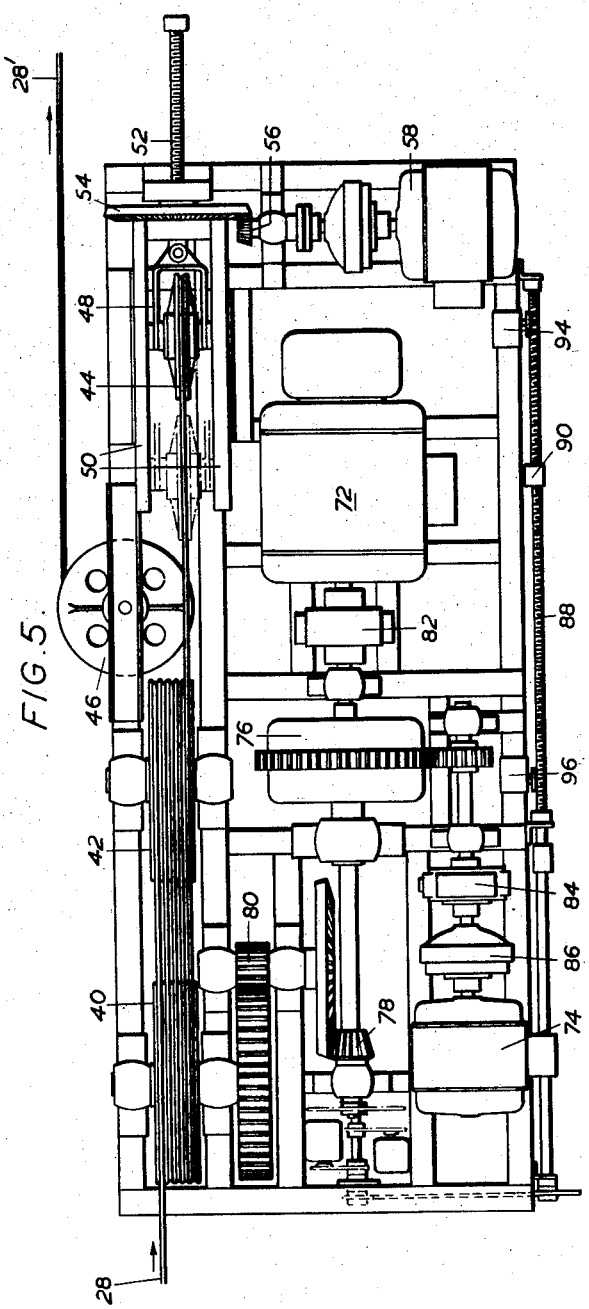

Nov. 11, 1958 — A. M. HOWARD — 2,859,704
VEHICLE HAULAGE SYSTEM
Filed July 17, 1953 — 4 Sheets-Sheet 4

Inventor
ALLAN MAURICE HOWARD,
By
Attorney

United States Patent Office 2,859,704
Patented Nov. 11, 1958

2,859,704

VEHICLE HAULAGE SYSTEM

Allan Maurice Howard, Tividale, Tipton, England, assignor to Nortons-Tividale Limited, Tipton, England Application July 17, 1953, Serial No. 368,640

Claims priority, application Great Britain July 25, 1952

4 Claims. (Cl. 104—176)

One kind of apparatus used for shunting railroad wagons at collieries and similar places consists of a bogie which can travel to and fro on a narrow track between rails for the wagons and which carries a device which can be moved from a position in which it clears a wagon to a position in which it engages a wagon so that the wagon can be hauled forwards and backwards by the bogie.

The principal object of the present invention is to provide a simple device which will engage a wagon to transmit forward and backward movement from a bogie to a wagon.

A further object is to provide such a device which lends itself to simple remote control.

In apparatus according to this invention the device consists of rollers movable between an inner position in which they will clear a wagon and an outer position in which they will engage the periphery of a wheel or wheels of a wagon close above the rails from behind and from in front so that the wagon can be moved forwards and backwards by movement of the bogie.

The rollers may be mounted on shafts which can swing about vertical pivots, and preferably there are two pairs of rollers, one pair to engage the front and one pair to engage the back of two wheels on the same axle of a wagon, and in moving to the outer position the rollers of one pair approach the rollers of the other pair. Preferably, moreover, the rollers are movable outwards in succession so as first to engage a wheel or wheels on one side of the point of engagement of the wheel with the track and thereafter from both sides of the point of engagement.

Figure 1:
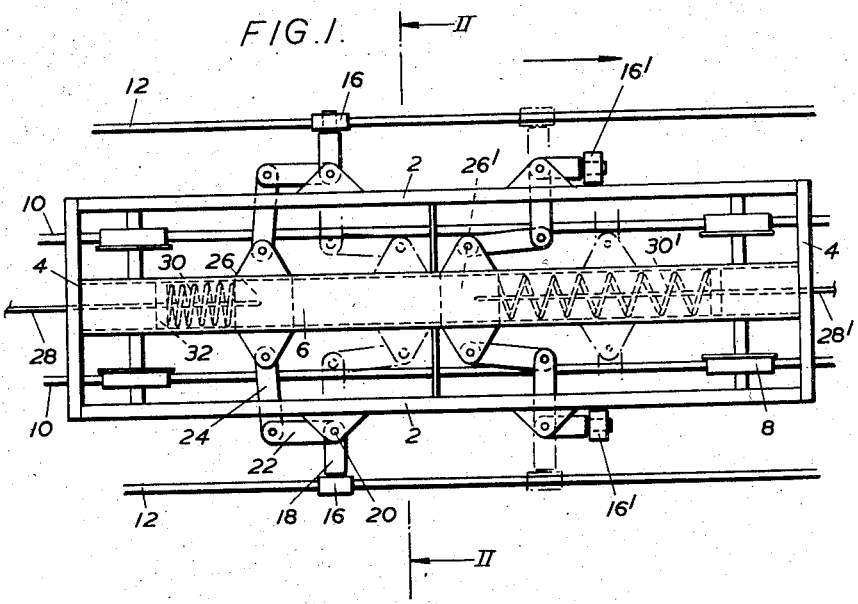
Figure 2:
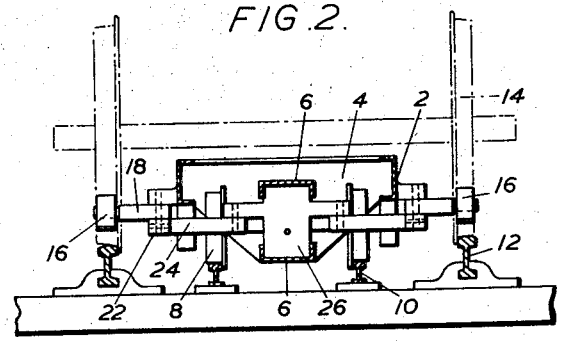
Figure 7:
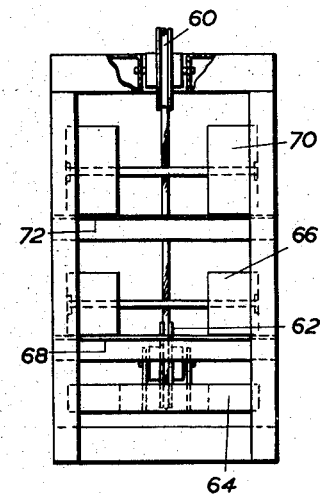
Figure 6:
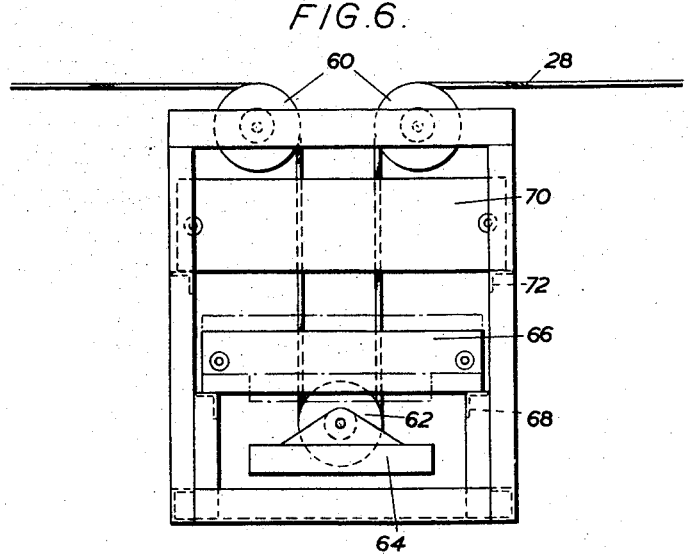

In the preferred construction the bogie is hauled forwards and backwards by lengths of rope and the same lengths of rope serve also to control movement of the rollers between their inner and outer positions. The lengths of rope may be separate, or may be parts of a single rope. This form of control is also the subject of Patent No. 2,767,662 issued October 23, 1956. This preferred construction will be best understood from a detailed description of one example which is shown in the accompanying drawings. In these drawings:

Figure 1 is a plan of the bogie;
Figure 2 is a section on the line II—II in Figure 1;
Figure 3 is a diagram of the complete apparatus;
Figure 4 shows a modification of the apparatus;
Figure 5 is a plan of the rope-control mechanism;
Figure 6 is an enlarged side elevation of a system of tensioning weights; and
Figure 7 is an end elevation of the same system.

The apparatus is intended for hauling single wagons or short trains of wagons successively in the same direction as is required for example in coal-loading installations where wagons are to be loaded from an overhead hopper. In the figures the wagons are to move from right to left as seen in Figures 1 and 3.

The bogie which is shown in detail in Figures 1 and 2 has a simple rectangular frame made up of side members 2, end members 4 and a pair of longitudinal channels 6 which form a box-like guide. The bogie has wheels 8 which run on the rails 10 of a narrow gauge track laid between the main rails 12 which carry the wheels 14 of the wagons.

The bogie carries a pair of rollers 16 which in their outer position serve to engage the front of the leading wheels of a wagon as shown in Figure 3 and also carries a pair of rollers 16′ which in their outer position engage the rear of the same wheels. The rollers 16 are mounted on shafts which are the outer ends of arms 18 of bell cranks pivoted to the bogie at 20. The other arms 22 of the bell cranks are connected by pivoted links 24 to a cross-head 26 which can slide between the channels 6. The rollers 16′ are similarly connected to a cross-head 26′. A length of rope 28 is anchored to the cross-head 26 and is led through the end of the bogie. A compression spring 30 is confined between the cross-head 26 and a stop 32 mounted between the channels 6. In the same way a length of rope 28′ is anchored to the cross-head 26′ and a compression spring 30′ acts on the cross-head 26′. The spring 30, however, requires a greater force to compress it further than does the spring 30.

The two lengths 28 and 28′ of rope are in fact opposite ends of the same rope which is led from the front of the bogie round a return pulley 34, as shown in Figure 3, then through a device 36 which includes a system of tensioning weights, then through a control mechanism 38 and finally round a return pulley, not shown, and so back to the bogie. The rope is supported at intervals along its length by the pulleys usual in rope haulage systems. In Figure 3 the device 36 and control mechanism 38 are shown installed in pits. They may alternatively be mounted on an overhead gantry as shown in Figure 4. In the control mechanism, as shown in Figure 5, the rope is led repeatedly round a driving drum 40 and an idle drum 42 and is also led round pulleys 44 and 46. The pulley 44 is mounted in a frame 48 which can slide to and fro in guides 50 under the control of a screw 52 cooperating with the threaded bore of a bevel gear 54. The bevel gear can be driven through a co-operating gear 56 by an electric motor 58 so as to move the pulley 44 to and fro. The effect of movement of the pulley 44 is, in conjunction with the device 36, to alter the tension in the length of rope 28 to any of three substantially different values. In the device 36 the length of rope 28 passes over guide pulleys 60 and also round a suspended pulley 62 which carries a weight in the form of a flat plate 64. As the pulley 44 is moved from left to right in Figure 5 so the pulley 62 is raised, and in rising the plate 64 first picks up a weight 66 which has been resting on ledges 68 and then picks up a further weight 70 which has been resting on ledges 72. In this way the tension in the length of rope 28 is increased in two definite stages. These increases are large compared with the differences in tension in the lengths 28 and 28′ which are necessary to haul the bogie to and fro even when in engagement with a train of wagons.

When the pulley 48 is in an extreme left-hand position and the pulley 62 is at the bottom of its travel then tension in the lengths of rope is low, both springs 30 and 30′ are expanded and the rollers 16 and 16′ are clear of a wagon. When the pulley 44 is moved to an intermediate position then the pulley 62 picks up the weight 66. This is the position shown in the figures. As a result the tension in the length of rope 28 increases sufficiently to compress the spring 30 and move the rollers 16 into their outer position. The tension in the length of rope 28′ (which as is explained above will differ from the tension in the rope 28 only by the amount induced by the haulage mechanism) is not, however, sufficient to compress the spring 30′. When the pulley 44 is moved to its extreme right-hand position then the pulley 62 picks up the weight 70 in addition and the tension in the lengths of rope is further increased so that the spring 30' is then compressed and the rollers 16' are moved to their outer position.

The driving drum 40 can be driven alternatively by a motor 72 and a motor 74. The two motors both drive the same differential gear 76 which is connected to the drum 40 through bevel gearing 78 and spur gearing 80. Each motor is provided with a brake 82 and 84 so that when the brake 82 is applied the drum can be driven by the motor 74 and when the brake 84 is applied the drum can be driven by the motor 72. In addition a fluid coupling 86 is interposed between the motor 74 and the brake 84. The drive from the differential gear to the drum also drives a long screwed shaft 88 carrying a nut 90. Alternatively this shaft may be driven from any other suitable element on the winch. The travel of this nut is proportional to the travel of the bogie and the nut serves to operate limit switches 94 and 96 which prevent the bogie overrunning its track.

The operation of the apparatus will be described starting from a position in which the bogie is clear of one train of wagons and is about to return to pick up a fresh train. The pulley 44 is moved to its intermediate position so that the rollers 16 are in their outer position and the bogie is then hauled rearwards by the motor 74. When the rollers 16 encounter the front of the wheels of the leading axle of the next train of wagons the fluid coupling is unable to transmit sufficient force to move the wagons and accordingly the bogie comes to rest. The motor 74 is then switched off, and the brake 84 is applied. The pulley 44 is moved to its right-hand position so that the rollers 16' engage the rear of the leading wheels of the train of wagons. The brake 82 is released and the bogie is then hauled forwards by the motor 72, drawing the wagons with it. The driving force is transmitted by the rollers 16'. It will be noticed that the linkage between each pair of rollers and its cross-head has a toggle action so that pressure on the rollers when in their outer position has little or no tendency to displace the cross-head. If at any point it is desired to slow down the wagons or to control them on a downward slope then force is transmitted by the rollers 16. It is also possible to reverse the motor 72 and drive the wagons backwards if desired. When the wagons have reached their destination the motor 72 is stopped, the brake 82 is applied, and the pulley 44 is moved to its left-hand position. Accordingly the rollers 16 and 16' are moved to their inner position so that the bogie can travel freely beneath the train of wagons. The brake 84 is released and the motor 74 is used to drive the bogie backwards towards the next train of wagons. Before the bogie reaches this next train the pulley 44 is returned to its intermediate position so that the rollers 16 are moved to their outer position.

It will be noted that the rollers 16 engage the wheels of the wagons only a small distance above the rails 12. This ensures that they do not foul any of the brake mechanism of the wagons.

I claim:

1. Apparatus for hauling railroad wagons in which the wagon wheels ride on a main track and a narrow guage track is laid between the rails of the main track comprising, a bogie running on the narrow guage track, said bogie including first and second rollers, first linkage means including a first pivoted arm connecting said first roller to said bogie, second linkage means including a second pivoted arm connecting said second roller to said bogie, said first and second linkage means being spaced longitudinally of the bogie and movable independently of one another, said first and second rollers being journaled on said first and second arms respectively and said arms mounted on said bogie for pivotal movement between inner positions wherein the rollers clear the wheels of a wagon and outer positions wherein said first roller engages the periphery of one wheel on one side of the point of engagement of the wheel with the track and said second roller engages the periphery of said wheel on the other side of the point of engagement of the wheel with the track, a first control means connected to said first linkage means for moving said first arm to said outer position, and a second control means connected to said second linkage means for subsequently moving said second arm to said outer position independently of the outward movement of said first arm.

2. Apparatus according to claim 1 wherein said first and second rollers comprise pairs of rollers and said first and second linkage means is adapted to move said second pair of rollers towards the first pair of rollers during movement to the outer positions.

3. Apparatus according to claim 1 wherein said first and second means includes first and second cross heads slidable in said bogie, said first and second cross heads being pivotally connected to said first and second linkage means respectively.

4. Apparatus according to claim 3 and said first and second means including a first length of rope connected to said first cross head and passing through one end of said bogie, a second length of rope connected to said second cross head and passing through the other end of said bogie, a first spring mounted on said bogie applying a force to said first cross head in opposition to a tension applied to said first length of rope, a second spring mounted on said bogie applying a substantially greater force to said second cross head in opposition to a tension applied to said second length of rope, and a driving and control mechanism to which said lengths of rope are connected and means operatively connected to said ropes to alter the tension in said ropes to effect movement of said first rollers and thereafter said second rollers.

References Cited in the file of this patent

UNITED STATES PATENTS

| | | |
|---|---|---|
| 552,900 | Fitzgerald | Jan. 14, 1896 |
| 843,116 | Strambini | Feb. 5, 1907 |
| 1,125,110 | Jones | Jan. 19, 1915 |
| 1,155,748 | Lovell | Oct. 5, 1915 |
| 1,482,228 | Hanley | Jan. 29, 1924 |
| 1,484,086 | Rutherford | Feb. 19, 1924 |
| 1,557,784 | Sharpnack | Oct. 20, 1925 |
| 1,573,388 | Friesen | Feb. 16, 1926 |
| 1,631,030 | Harding | May 31, 1927 |
| 1,697,356 | Hoover | Jan. 1, 1929 |
| 1,886,588 | Riblet | Nov. 8, 1932 |
| 1,891,795 | Buetell | Dec. 20, 1932 |
| 2,481,421 | Hayes | Sept. 6, 1949 |
| 2,767,662 | Howard et al. | Oct. 23, 1956 |

FOREIGN PATENTS

| | | |
|---|---|---|
| 358,956 | Germany | Nov. 2, 1920 |
| 518,799 | Germany | Mar. 4, 1931 |
| 101,908 | Sweden | July 1, 1941 |